(12) United States Patent
Cunkelman et al.

(10) Patent No.: US 6,305,313 B1
(45) Date of Patent: Oct. 23, 2001

(54) POP-UP TEMPERATURE INDICATOR FOR USE IN A 3-CD TYPE AIR COMPRESSOR OR SIMILAR DEVICE

(75) Inventors: Brian L. Cunkelman, Blairsville; Jennifer L. Ray, Ruffsdale, both of PA (US)

(73) Assignee: Westinghouse Air Brake Company, Wilmerding, PA (US)

( * ) Notice: Subject to any disclaimer, the term of this patent is extended or adjusted under 35 U.S.C. 154(b) by 0 days.

(21) Appl. No.: 09/189,212

(22) Filed: Nov. 10, 1998

(51) Int. Cl.[7] .................. G01K 1/16; G01K 1/14
(52) U.S. Cl. ................ 116/218; 116/217; 374/160
(58) Field of Search .................. 116/217, 218, 116/216; 374/160, 148, 155; 417/63, 243

(56) References Cited

U.S. PATENT DOCUMENTS

| | | | |
|---|---|---|---|
| 3,245,260 | * 4/1966 | Werner | 374/148 |
| 3,965,849 | * 6/1976 | Gee | 116/218 |
| 4,034,698 | * 7/1977 | Durand | 116/216 |
| 4,356,790 | * 11/1982 | Gee | 374/160 |
| 4,362,462 | * 12/1982 | Blotenberg | 417/243 |
| 4,443,156 | * 4/1984 | Dunnam, Jr. | 417/63 |
| 4,448,147 | * 5/1984 | Dewaegheneire | 116/216 |
| 4,818,119 | * 4/1989 | Busch et al. | 116/217 |
| 5,046,447 | * 9/1991 | Steinke et al. | 374/160 |
| 5,203,278 | * 4/1993 | Kinney | 116/218 |
| 5,380,092 | * 1/1995 | Alain | 116/217 |
| 5,487,352 | * 1/1996 | Williams et al. | 374/160 |
| 5,547,019 | * 8/1996 | Iacullo | 417/243 |
| 5,718,633 | * 2/1998 | Gehrke | 116/218 |

FOREIGN PATENT DOCUMENTS

288155 A2 * 10/1988 (EP) ........................ 374/160

* cited by examiner

Primary Examiner—Diego Gutierrez
Assistant Examiner—Stanley J. Pruchnic, Jr.
(74) Attorney, Agent, or Firm—James Ray & Associates

(57) ABSTRACT

A temperature indicator for indicating when a specified temperature has been exceeded in a fluid flow through a conduit. Such conduit having an aperture and the temperature indicator being mountable in such aperture and engagable therewith such that the temperature indicator projects through such aperture and into such fluid flow in such conduit. The temperature indicator includes a housing which substantially encloses an internal chamber and has a bore extending from the internal chamber to an external surface of the housing. An indicator member is disposed, at least in part, within the internal chamber and extends into the bore. A biasing element is disposed within the internal chamber and exerts a biasing force between the housing and the indicator member and urges the indicator member toward the bore. A bonding agent forms a bond between the indicator member and the housing to thereby restrain the indicator member from movement toward the bore under action of the biasing element. The bonding agent is thermosensitive to substantially release the bond between the indicator member and the housing when a temperature of the bonding agent substantially reaches the specified temperature.

20 Claims, 4 Drawing Sheets

POP-UP TEMPERATURE INDICATOR FOR USE IN A 3-CD TYPE AIR COMPRESSOR OR SIMILAR DEVICE

CROSS-REFERENCE TO RELATED APPLICATIONS

The present application relates to similar subject matter as is disclosed in U.S. patent application Ser. No. 09/189,210, now allowed, filed contemporaneously herewith by Brian L. Cunkelman and Jennifer Ray and entitled "Temperature Indicator for Use in a Pressurized Environment", and to U.S. patent application Ser. No. 09/189,209, now U.S. Pat. No. 6,125,879, also filed contemporaneously herewith and entitled "Temperature Activated Diversion Valve". Both of the above-referenced applications are assigned to the assignee of the present application and are hereby expressly incorporated herein by reference thereto.

BACKGROUND OF THE INVENTION

1. Field of the Invention

The present invention relates, in general, to a temperature indicator for providing a visual indication of whether a fluid (i.e., gas or liquid) has exceeded a specified design temperature and, more particularly, this invention relates to a temperature indicator that is adapted for mounting in an aperture provided in a conduit carrying the fluid and, still more particularly, the present invention relates to a temperature indicator for indicating whether compressed air flowing in a conduit of a two-stage type air compressor has exceeded a specified design temperature.

2. Description of the Related Art

The inventive temperature indicator is seen to have particular application to the field of air compressors and, most particularly, to two-stage type air compressors which incorporate or utilize an intercooler system for cooling an already compressed air exiting from a first low compression stage and prior to entry into a second high compression stage. Even more particularly, the inventive temperature indicator is seen to have application to a thermostatically controlled intercooler system incorporated into or utilized by a two-stage type air compressor, wherein, in order to prevent the undue formation of condensate in the intercooler, at least a portion of the air exiting the first low compression stage is passed through the intercooler apparatus and then mixed with the remainder of the air that bypasses the intercooler in order to achieve a predetermined inlet temperature to the second high compression stage.

OBJECTS OF THE INVENTION

One object of the present invention is the provision of a temperature indicator which provides an easily observable visual indication of whether a fluid contained in a container or flowing through a conduit has, at some time, exceeded a specified temperature.

Another object of the present invention is the provision of such a temperature indicator which is reliable in operation, rather simple in design and, therefore, relatively inexpensive to manufacture.

Yet another object of the present invention is the provision of such a temperature indicator which can be used to monitor the communication of air in a conduit of an air compressor, particularly, a two-stage air compressor having an intercooler mechanism provided between a first low pressure cylinder and a second high pressure cylinder thereof and, even more particularly, a two-stage air compressor wherein a bypass of the intercooler mechanism is thermostatically controlled.

In addition to the objects and advantages of the present invention described above, various other objects and advantages of the invention will become more readily apparent to those persons skilled in the relevant art from the following more detailed description of the invention, particularly, when such description is taken in conjunction with the attached drawing Figures and with the appended claims.

SUMMARY OF THE INVENTION

In one aspect, the invention generally features a temperature indicator for indicating when a specified temperature has been exceeded in a fluid flow through a conduit, such conduit having an aperture, and the temperature indicator being mountable in such aperture and engagable therewith such that the temperature indicator projects through such aperture and into such fluid flow in such conduit. The temperature indicator includes a housing which substantially encloses an internal chamber and has a bore extending from the internal chamber to an external surface of the housing. An indicator member is disposed, at least in part, within the internal chamber and extends into the bore. A biasing element is disposed within the internal chamber and exerts a biasing force between the housing and the indicator member and urges the indicator member toward the bore and a bonding agent forming a bond between the indicator member and the housing to thereby restrain the indicator member from movement toward the bore under action of the biasing element. The bonding agent is thermosensitive to substantially release the bond between the indicator member and the housing when a temperature of the bonding agent substantially reaches the specified temperature.

In another aspect, the invention generally features a temperature indicator for indicating when a specified temperature has been exceeded in a fluid flow through a conduit of a two-stage air compressor. The air compressor includes at least one low pressure cylinder for receiving air at an ambient atmospheric pressure and for compressing such air to a first elevated pressure. The air compressor also has a high pressure cylinder for receiving such air at such first elevated pressure and for compressing such air at such first elevated pressure to a second elevated pressure substantially higher than the first elevated pressure and a conduit for supplying such air at the first elevated pressure to the high pressure cylinder. The temperature indicator is mounted in the conduit such that the temperature indicator projects through the conduit and into such fluid flow in the conduit. The temperature indicator includes a housing substantially enclosing an internal chamber, the housing having a bore extending from the internal chamber to an external surface of the housing and an indicator member disposed, at least in part, within the internal chamber and extending from the internal chamber and into the bore. A biasing element is disposed within the internal chamber and exerts a biasing force between the housing and the indicator member to urge the indicator member toward the bore. A bonding agent forms a bond between the indicator member and the housing to thereby restrain the indicator member from movement toward the bore under action of the biasing element. The bonding agent is thermosensitive to substantially release the bond between the indicator member and the housing when a temperature of the bonding agent substantially reaches the specified temperature.

In yet another aspect, the invention generally features a temperature indicator assembly for indicating when a specified temperature has been exceeded in a fluid flow through a conduit. Such conduit has an aperture and the temperature indicator assembly is mountable in such aperture and engagable therewith such that the temperature indicator assembly projects through such aperture and into such fluid flow in such conduit. The temperature indicator assembly includes a cartridge holder for engagement with such aperture in such channel. The cartridge holder includes a concavity formed therein and a bore extending from the concavity to an external surface of the cartridge holder. A cartridge is provided for attachment to the cartridge holder. The cartridge includes a base member, a cylinder portion extending outwardly from the base member and an indicator member having a piston portion and a stem portion extending outwardly from the piston portion. The piston portion of the indicator member and the cylinder portion of the cartridge being slidingly mated for coaxial movement therebetween. A biasing element is disposed between the piston portion and the base member and urges the piston portion away from the base member. A bonding agent forms a bond between the indicator member and the cylinder portion to thereby restrain the indicator member from movement away from the base member under action of the biasing element. The bonding agent is thermosensitive to substantially release the bond between the indicator member and the cylinder portion when a temperature of the bonding agent substantially reaches the specified temperature. The temperature indicator additionally includes a mechanism for releasably attaching the cartridge to the cartridge holder to thereby form an assembled structure and the stem portion of the indicator member extends into the bore in the assembled structure.

The present invention will now be described by way of a particular preferred embodiment, reference being had to the accompanying drawings, wherein:

DETAILED DESCRIPTION OF THE PREFERRED EMBODIMENT

Figure 1:
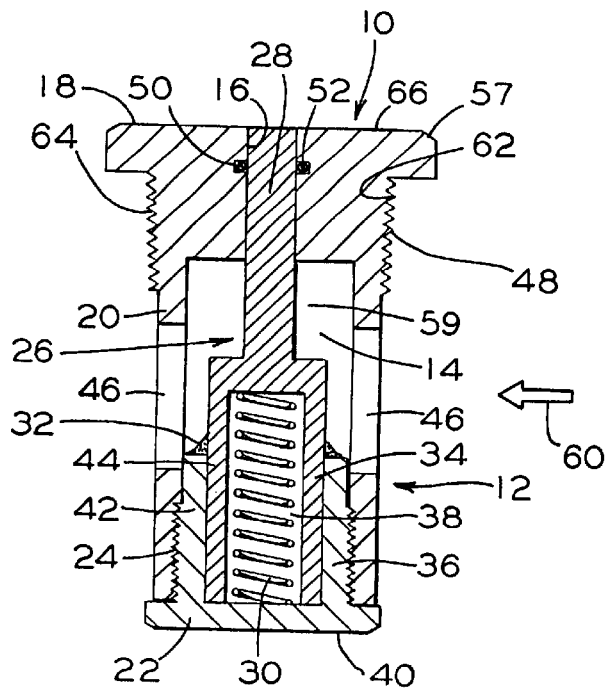
FIG. 1 is a cross-sectional elevational view through a pop-up temperature indicator constructed according to the invention and depicting a first configuration of the temperature indicator before it has been exposed to a fluid exceeding a specified design temperature.

Prior to proceeding to the more detailed description of the invention, it should be noted that identical components which have identical functions have been identified with identical reference numerals for the sake of clarity and understanding of such invention.

Figure 2:
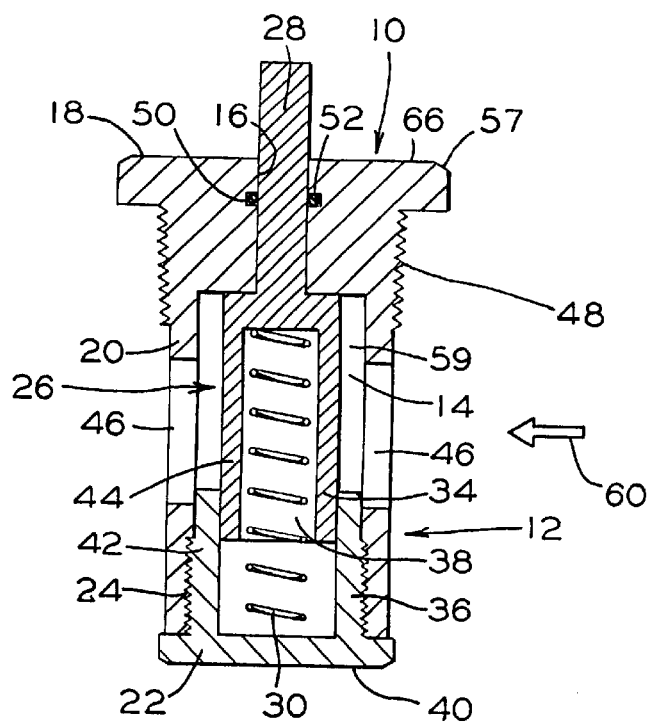
FIG. 2 is a cross-sectional elevational view of the pop-up temperature indicator of FIG. 1 showing the temperature indicator in a second configuration after it has been exposed to a fluid exceeding the specified design temperature.

Referring initially, most particularly, to FIGS. 1 and 2, a pop-up temperature indicator, generally designated 10, and constructed according to the present invention, generally includes a housing, generally designated 12, substantially enclosing an internal chamber 14 there within. A bore 16 extends through a wall of the housing 12 from the internal chamber 14 to an external surface 18 of the housing 12. The housing 12 is, preferably, of two-piece construction and includes a first housing member 20 and a second housing member 22 which are preferably engaged through the provision of mating threaded portions 24 provided thereon. Engagement of the first and second housing members 20 and 22, respectively, through the threaded portions 24 generally substantially encloses the internal chamber 14.

An indicator member, generally designated 26, is substantially positioned within the internal chamber 14 and includes a stem portion 28 extending outwardly from a piston member 34 and into the bore 16. A biasing element 30 is disposed within the internal chamber 14 and caged between the piston member 26 and the second housing member 22. Such biasing element 30 exerts a biasing force urging the indicator member 26 towards the bore 16 and, therefore, the stem portion 28 further into the bore 16. Preferably, the biasing element 30 is provided in the form of a coil spring, as shown. Of course, other well known biasing elements may be employed, e.g., diaphragm springs, etc.

A bonding agent 32 is positioned adjacent and in bonding engagement with both the indicator member 26 and the housing 12 (most particularly, the second housing member 22) for bonding them together and to thereby restrain the indicator member 26 from movement toward the bore 16. The bonding agent 32 may be deposited in the form of a fillet encircling the indicator member 26, as shown.

The bonding agent 32 is a "thermosensitive" bonding agent, in the sense that its bonding force is substantially reduced upon its attaining the specified design temperature, with the result that the indicator member 26 is then substantially freed to move toward the bore 16 under the action of the biasing element 30. Preferably, the bonding agent 32 is one of the family of thermosensitive bonding agents of which, for example, Indium (In) is a member. However, those of ordinary skill in the art will recognize that other thermosensitive bonding agents may be employed in its stead.

Preferably, the bonding agent includes Indium (In) and, even more preferably the bonding agent is an Indium (In) alloy. Indium (In) alloys are available which melt, and therefore reduce their bonding force, upon attaining various specified temperatures. One of the various sources of such Indium (In) alloys is Indium Corporation of America®.

Preferably, as shown in FIG. 1, the stem portion 28 is dimensioned such that, in the first configuration wherein the biasing element 30 is compressed, the distal end of the stem portion 28 is substantially flush with the external surface 18 of the first housing member 20.

Referring most particularly now to FIG. 2, in the second configuration, wherein the temperature indicator 10 has been exposed to a temperature exceeding the specified design temperature, the bonding element 32 (FIG. 1) has released the bonding of the indicator member 26 to the housing 12, with the result that the stem portion 28 protrudes beyond the external surface 18.

In the particular presently preferred embodiment shown in FIGS. 1–6, the indicator member 26 includes a piston portion 34 which slidingly mates with a cylinder portion 36 provided on the housing 12 to permit coaxial movement therebetween. Preferably, the cylinder portion 36 is in the form of a recess 38 provided in the second housing member 22.

Most preferably, such second housing member 22 includes a base member 40 from which a first cup-shaped structure 42 extends outwardly to form the recess 38 in second housing member 22. In addition, the piston portion 34 of the indicator member 26 is provided as a second cup-shaped structure 44. As can be seen in FIGS. 1 and 2, provision of the first and second cup-shaped structures 42 and 44, respectively, forms a particularly good structure for enclosing a coil spring as the biasing element 30 therebetween.

In order to allow the bonding agent 32 to be readily exposed to the fluid flow within the conduit wherein the temperature indicator 10 is mounted and positioned, the housing 12 is provided with at least one, and preferably two or more, ports 46, these ports 46 preferably taking the form of openings formed in the first housing member 20.

The housing 12 is provided with a mounting mechanism for permitting mounting of the temperature indicator 10 to the conduit containing the fluid flow, preferably furnished as an external threaded portion 48 on the first housing member 20. To prevent the fluid in the conduit from escaping via the internal chamber 14, a fluid tight seal 50, preferably in the form of an O-ring, encircles the stem portion 28 and is positioned preferably within a groove 52 provided on the wall of the bore 16.

Figure 3:
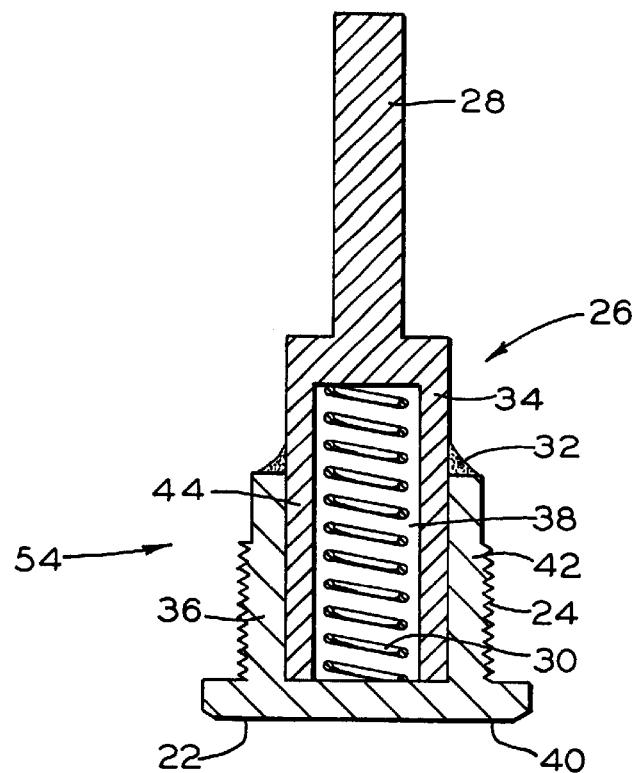
FIG. 3 is a cross-sectional elevational view of a cartridge component of the inventive temperature indicator.
Figure 4:
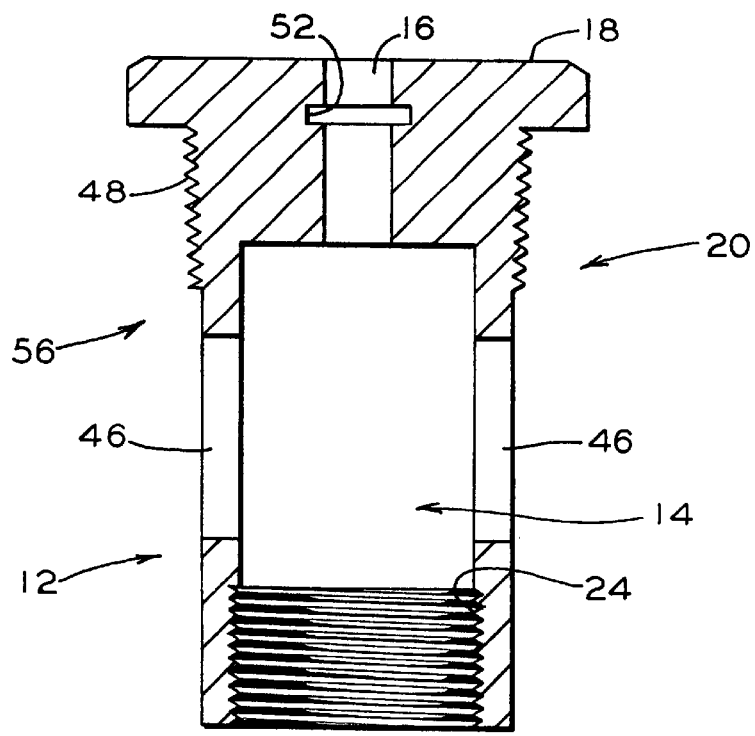
FIG. 4 is a cross-sectional elevational view of a cartridge holder component of the inventive temperature indicator.
Figure 5:
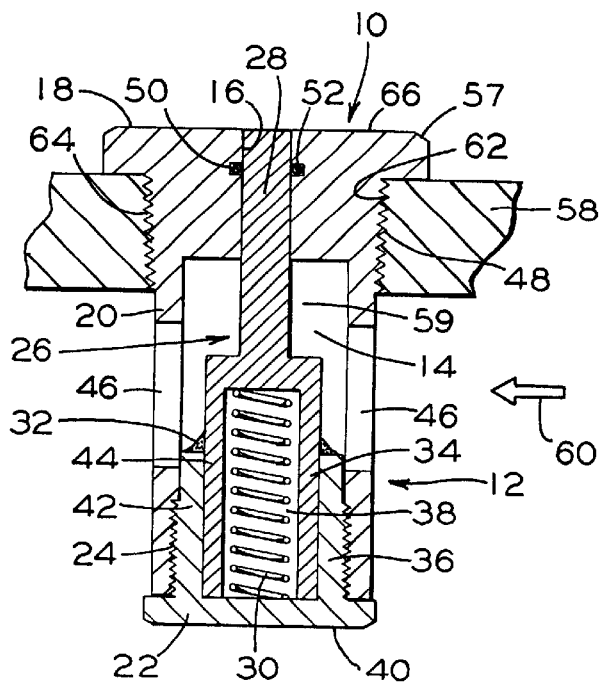
FIG. 5 is a cross-sectional elevational view of the inventive temperature indicator mounted in a conduit carrying a fluid flow, the temperature indicator being in the first unexposed configuration.
Figure 6:
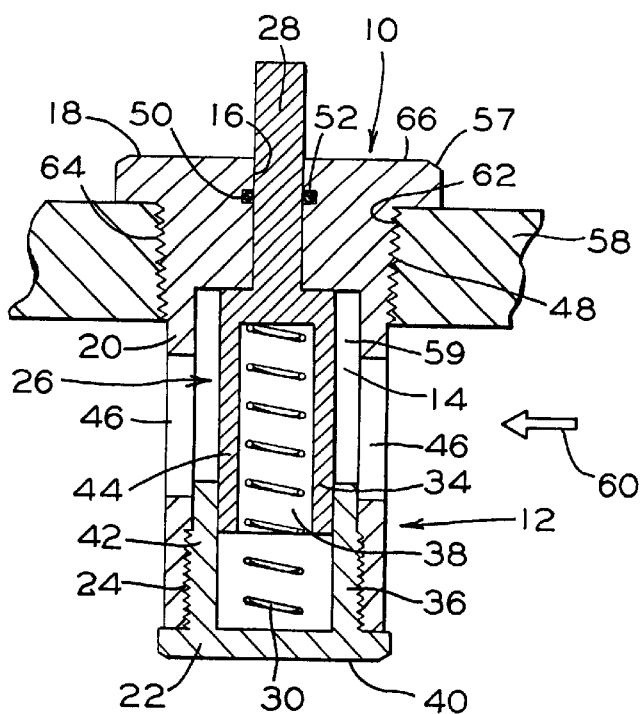
FIG. 6 is a cross-sectional elevational view of the inventive temperature indicator mounted in such conduit carrying such fluid flow, the temperature indicator being in the second exposed configuration.

FIGS. 3 and 4 illustrate an aspect of the invention wherein the inventive temperature indicator 10 is configured as a two-piece construction, including a cartridge, which can be replaced with a new cartridge following an exposure to a fluid flow having a temperature exceeding the specified design temperature, and a cartridge holder for accepting the cartridge.

Thus, in FIGS. 3 and 4, a replaceable cartridge according to this aspect of the invention is generally designated by reference numeral 54, while a cartridge holder adapted to receive the cartridge 54 is generally designated by reference numeral 56. The remaining structural elements shown in FIGS. 3 and 4 substantially correspond to those shown and designated in FIGS. 1 and 2, like reference numerals being used.

As noted above, the temperature indicator 10 is particularly suited for mounting in an aperture provided in a wall of a conduit containing a fluid flow therein. Such mounting of the temperature indicator 10 in a conduit wall is illustrated most particularly in FIGS. 5 and 6, wherein a conduit wall 58 enclosing a fluid flow 60 is provided with a conduit aperture 62, dimensioned to receive and engage the temperature indicator 10. To this end, the conduit aperture 62 is provided with threads 64 which match the mounting mechanism (e.g., the threaded portion) 48 of the first housing member 20. When so positioned, the bonding agent 32 is exposed to the fluid flow 60 through the ports 46, and the external surface 18 of the first housing member 20 is positioned as an exposed surface 66, i.e., outside of the conduit wall 58.

The temperature indicator 10 is provided with a torque transmitting portion for allowing the temperature indicator 10 to be forcibly threaded into the threads 64 of the aperture 62. Preferably, the torque transmitting portion takes the form of a hexagonal bolt head 57 formed on the first housing portion 20, although clearly other torque transmitting structures (e.g., a screwdriver slot, etc.) may be substituted.

Mounting of the inventive temperature indicator 10 in the conduit wall 58 does not appreciably restrict the fluid flow through the conduit, since the fluid is free to flow around the temperature indicator 10, and additionally, since the fluid can flow through the temperature indicator 10 itself via the ports 46 and an annular space 59 formed between the indicator member 26 and the second housing member 22.

In a preferred embodiment, the fluid flow 60 is a gas flow, and in one particularly preferred embodiment, the fluid flow 60 is the flow of air through a conduit. In this particularly preferred embodiment, the temperature indicator 10 may be used to monitor the temperature of air passing through a conduit of a two-stage air compressor unit having at least one integral intercooler. Such an air compressor unit is manufactured by the assignee of the present patent application and is referred to in the rail transportation industry as a "3-CD" Type Air Compressor, manufactured by Westinghouse Air Brake Company.

Figure 7:
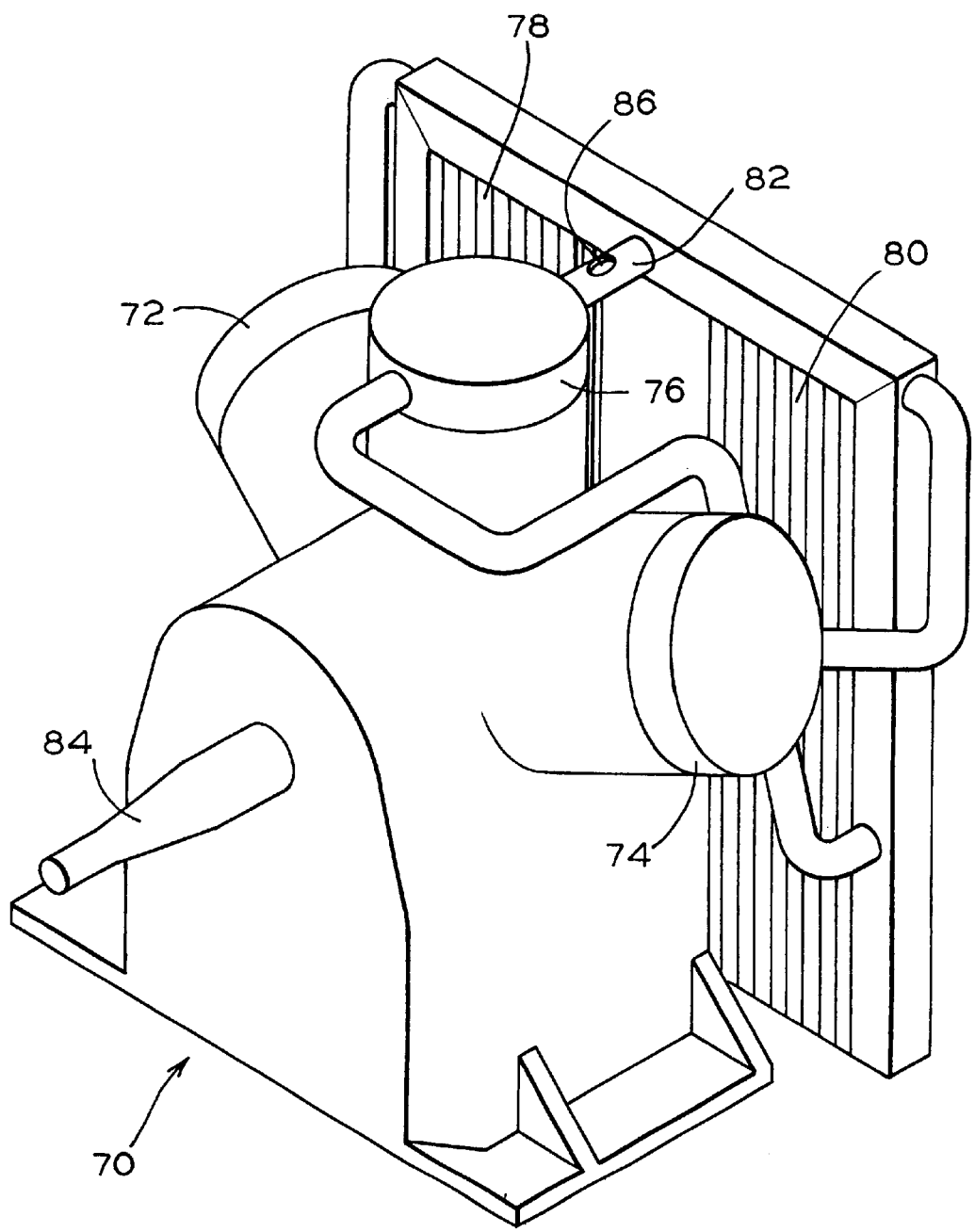
FIG. 7 is a perspective view of a two stage air-cooled air compressor unit, showing a mounting of the inventive temperature indicator on a conduit thereof in order to monitor the temperature of an air flow through the conduit.

Such a "3-CD" Type Air Compressor unit is illustrated in FIG. 7 and is further described in U.S. Pat. No. 5,106,270 issued to Goettel et al. on Apr. 21, 1992 and in the publication entitled "Instructions for Disassembly, Repair and Assembly of '3-CD'Air Compressors," copyright 1994 by Westinghouse Air Brake Company, both this publication and U.S. Pat. No. 5,106,270 being hereby expressly incorporated by reference, with the same results as if their contents were fully set forth herein.

As shown in FIG. 7, a "3-CD" Type Air Compressor unit 70 generally includes a pair of low pressure or first stage air compression cylinders or stages 72 and 74, which intake filtered ambient air at the ambient atmospheric pressure and compress this air to a first elevated pressure. The air compressor unit 70 also includes a common high pressure or second stage air compression cylinder 76. As a result of the first stage of compression, the air exits the low pressure cylinders 72 and 74 at an elevated temperature.

Rather than introduce the air exiting from the low pressure compression cylinders 72 and 74 directly into the high pressure cylinder 76, it has been found that more efficient compression is achieved by cooling the air between the first and second stages of compression. To this end, the air compressor unit 70 is provided with a pair of intercooler elements 78 and 80, which receive the air exiting from the low pressure cylinders 72 and 74, respectively, and cool this air prior to introduction to the high pressure cylinder 76. The cooled air exiting the intercoolers 78 and 80 is then introduced into and carried by a common conduit 82 to the high compression cylinder 76.

The air compressor unit 70 is powered through an input crankshaft 84, torque to which may be supplied via various mechanical linkages (e.g., belts and pulleys) by the power plant of the locomotive. However, it is becoming more common for torque to be supplied to the crankshaft 84 via so-called direct drive motors, and to only activate the air compressor unit 70, and therefore the driving motor, when required, i.e., "on demand". Thus, it is common for the air compressor unit 70 to be operated in a repeatedly start/stop pattern or cycle.

In such a cycle, following a start up phase, the air may be so cool upon exiting the intercoolers 78 and 80 that excess condensation may be formed, since the air at the interstage pressure is not of a sufficiently elevated temperature to retain all of its moisture in the vapor phase. The formation of such condensation in the intercoolers 78 and 80 can have injurious results, for example, by leaking past the cylinder rings in the second high pressure stage and into the crankcase lubricant.

Accordingly, it has been found desirable, particularly in the case wherein the air compressor unit 70 is operated on a start/stop basis, to provide a thermostatically controlled system for routing at least some portion of the air flow so as to bypass the intercoolers 78 and 80 for some period of time following start up until the air exiting the low pressure cylinders 72 and 74 has reached a determined minimum temperature, whereupon the intercoolers 78 and 80 are then reintroduced into the flow route in order to provide a substantially constant intercooler discharge temperature.

One such system for thermostatically controlling the flow of air through the intercoolers 78 and 80 which is employed by the assignee of the present invention in conjunction with its "3-CD" compressors is generally referred to as a "Thermostatically Controlled Intercooler System", or "TCIS".

The temperature indicator 10 of the present invention finds a particularly preferred application when used in conjunction with a "3-CD" Type Air Compressor, and an even more particularly preferred application when the "3-CD" Type Air Compressor is equipped with a "Thermostatically Controlled Intercooler System" (i.e., "TCIS") that controls the flow of air through the intercoolers 78 and 80 dependent upon its temperature.

Accordingly, in FIG. 7, reference numeral 86 indicates the presently preferred location for mounting of the inventive temperature indicator 10. Such location 86 is on a common high pressure intake conduit 82 of a "3-CD" Type Air Compressor. When mounted at such location 86, the temperature indicator 10 of the present invention gives a readily determinable and easily visual indication whether the temperature of the air flowing in the common high pressure intake conduit 82 has, at some time, exceeded the specified design temperature and, thus, provides a good indication as to whether the temperature controlled intercooler system ("TCIS")of the "3-CD" type air compressor unit 70 has malfunctioned, indicating a need for further investigation and possible repair, for example, examination and/or replacement of a thermostat.

While the present invention has been described by way of a detailed description of a particularly preferred embodiment, it will be readily apparent to those of ordinary skill in the art that various substitutions of equivalents may be affected without departing from the spirit or scope of the invention as set forth in the appended claims.

What is claimed is:

1. A temperature indicator for indicating when a specified temperature has been exceeded in a fluid flow through a conduit, such conduit having an aperture, such aperture including a rigid engagable portion, and said temperature indicator being rigidly mountable in such aperture and engagable with such rigid engagable portion of such aperture such that said temperature indicator projects through such aperture and into such fluid flow in such conduit, said temperature indicator comprising:

a housing;
said housing substantially enclosing an internal chamber;
said housing having a bore extending from said internal chamber to an external surface of said housing;
an indicator member disposed, at least in part, within said internal chamber;
said indicator member extending from said internal chamber and into said bore;
a biasing element disposed within said internal chamber and exerting a biasing force between said housing and said indicator member and urging said indicator member toward said bore;
a bonding agent forming a bond between said indicator member and said housing to thereby restrain said indicator member from movement toward said bore under action of said biasing element; and
an engaging portion capable of rigidly engaging such rigid engagable portion of such aperture such that said temperature indicator projects through such aperture and into such fluid flow when said engaging portion of said temperature indicator is rigidly engaged with such rigid engagable portion of such conduit;
said bonding agent being thermosensitive to substantially release said bond between said indicator member and said housing when a temperature of said bonding agent substantially reaches said specified temperature; and
said bonding agent being disposed on said temperature indicator such that said bonding agent is placed in substantially direct contact with such fluid flow in such conduit when said engaging portion of said temperature indicator is rigidly engaged with such rigidly engagable portion of such aperture such that said temperature indicator projects through such aperture and into such fluid flow in such conduit.

2. A temperature indicator, according to claim 1, wherein said indicator member includes a piston portion and a stem portion, said stem portion extending into said bore, said housing includes a cylinder portion, said piston portion of said indicator member and said cylinder portion of said housing are slidingly mated for substantially coaxial movement therebetween and said biasing element is disposed substantially between said piston portion of said indicator member and said cylinder portion of said housing.

3. A temperature indicator, according to claim 2, wherein said housing includes:
a first housing member mountable in and engagable with such aperture of such conduit; and
a separate and distinct second housing member connectable to said first housing member;
and wherein said cylinder portion of said housing includes a recess provided in said second housing member.

4. A temperature indicator, according to claim 3, wherein said bonding agent is disposed adjacent both of said piston portion and said cylinder portion to thereby bond said piston portion and said cylinder portion together.

5. A temperature indicator, according to claim 3, wherein said second housing member includes each of a base member and a first cup-shaped structure extending outward from said base member and contiguous therewith and said cylinder portion includes said first cup-shaped structure and wherein said piston portion includes a second cup-shaped structure extending outward from said stem portion of said indicator member and contiguous therewith, and wherein said biasing element is at least in part disposed within said first and second cup-shaped structures and exerts said biasing force therebetween.

6. A temperature indicator, according to claim 3, wherein said temperature indicator additionally includes:
an attachment apparatus for removably attaching said second housing member to said first housing member.

7. A temperature indicator, according to claim 1, wherein said housing is provided with at least one port for providing communication of such fluid from an exterior of said housing to said interior chamber when said temperature indicator is mounted in such aperture and projects therethrough into such fluid flow.

8. A temperature indicator, according to claim 1, wherein said housing has an exposed surface when said temperature indicator is mounted in such aperture of such conduit and said temperature indicator projects through such aperture and into such fluid flow, and wherein said temperature indicator has at least two configurations:

a first configuration indicating non-exposure of said bonding agent to such fluid exceeding said specified temperature, said stem portion of said indicator member extending beyond said exposed surface of said housing a first distance in said first configuration; and a second configuration indicating exposure of said bonding agent to such fluid exceeding said specified temperature, said stem portion of said indicator member extending beyond said exposed surface of said housing a second distance in said second configuration, said second distance being substantially greater than said first distance.

9. A temperature indicator, according to claim 8, wherein said first distance is substantially about zero.

10. A temperature indicator, according to claim 1, wherein said bonding agent comprises at least one of Indium and an Indium alloy and said biasing element comprises a coil spring.

11. A temperature indicator, according to claim 1, wherein said temperature indicator further includes a fluid tight seal encircling said stem portion of said indicator member and disposed within said bore.

12. A method for visually indicating when a specified temperature has been exceeded in a fluid flow through a conduit of a two-stage air compressor, wherein said air compressor includes at least one low pressure cylinder for receiving air at an ambient atmospheric pressure and for compressing such air to a first elevated pressure, a high pressure cylinder for receiving such air at such first elevated pressure and for compressing such air at such first elevated pressure to a second elevated pressure substantially higher than said first elevated pressure, and a conduit for supplying such air at said first elevated pressure to said high pressure cylinder, said method comprising the steps of:

mounting a temperature indicator in said conduit such that said temperature indicator projects through said conduit and into said fluid flow in said conduit;

said temperature indicator comprising:

a housing, said housing substantially enclosing an internal chamber and said housing having a bore extending from said internal chamber to an external surface of said housing;

an indicator member disposed, at least in part, within said internal chamber of said housing, said indicator member extending from said internal chamber and into said bore;

a biasing element disposed within said internal chamber and exerting a biasing force between said housing and said indicator member and urging said indicator member toward said bore; and a bonding agent forming a bond between said indicator member and said housing to thereby restrain said indicator member from movement toward said bore under action of said biasing element, said bonding agent being thermosensitive to substantially release said bond between said indicator member and said housing when a temperature of said bonding agent substantially reaches said specified temperature;

said bonding agent being disposed on said temperature indicator such that said bonding agent is placed in substantially direct contact with said fluid flow in said conduit when said temperature indicator is mounted in said conduit such that said temperature indicator projects through said conduit and into said fluid flow in said conduit.

13. A method for visually indicating when a specified temperature has been exceeded in a fluid flow through a conduit of a two-stage air compressor, according to claim 12, wherein said indicator member includes a piston portion and a stem portion which extends into said bore and said housing includes a cylinder portion, said piston portion of said indicator member and said cylinder portion of said housing being slidingly mated for substantially coaxial movement therebetween, said biasing element being disposed substantially between said piston portion of said indicator member and said cylinder portion of said housing and said housing being provided with at least one port for providing communication of such fluid flow in said conduit from an exterior of said housing to said interior chamber.

14. A method for visually indicating when a specified temperature has been exceeded in a fluid flow through a conduit of a two-stage air compressor, according to claim 13, wherein said housing includes a first housing member and a separate and distinct second housing member connectable to said first housing member and said cylinder portion of said housing includes a recess provided in said second housing member and said bonding agent is disposed adjacent both said piston portion and said cylinder portion to thereby bond said piston portion and said cylinder portion together and said second housing member includes a base member and a first cup-shaped structure extending outward from said base member and formed contiguous therewith, said cylinder portion including said first cupshaped structure and said piston portion including a second cup-shaped structure extending outward from said stem portion of said indicator member and contiguous therewith, said piston portion including said second cup-shaped structure and said biasing element is at least in part disposed within said first and second cup-shaped structures and exerts said biasing force therebetween.

15. A method for visually indicating when a specified temperature has been exceeded in a fluid flow through a conduit of a two-stage air compressor, according to claim 12, wherein said bonding agent includes at least one of Indium and an Indium alloy and said housing has an exposed surface visible from outside of said conduit and said temperature indicator has at least two configurations, a first configuration indicating non-exposure of said bonding agent to such fluid exceeding said specified temperature, said stem portion of said indicator member extending beyond said exposed surface of said housing a first distance in said first configuration and a second configuration indicating exposure of said bonding agent to such fluid exceeding said specified temperature, said stem portion of said indicator member extending beyond said exposed surface of said housing a second distance in said second configuration, said second distance being substantially greater than said first distance and said biasing element is a coil spring and said temperature indicator additionally includes a connection mechanism for removably connecting said second housing member to said first housing member and a fluid tight seal encircling said stem portion of said indicator member disposed within said bore.

16. A method for visually indicating when a specified temperature has been exceeded in a fluid flow through a conduit, said method comprising the steps of:

providing an aperture in said conduit;

mounting a temperature indicator assembly in such aperture such that said temperature indicator assembly projects through such aperture and into such fluid flow in such conduit;

said temperature indicator assembly comprising:
- a cartridge holder for engagement with such aperture in such conduit, said cartridge holder having a concavity formed therein;
- a bore extending from said concavity to an external surface of said cartridge holder; and
- a cartridge for attachment to said cartridge holder, said cartridge including:
- a base member;
- a cylinder portion extending outwardly from said base member;
- an indicator member, said indicator member including a piston portion and a stem portion extending outwardly from said piston portion, said piston portion of said indicator member and said cylinder portion being slidingly mated for coaxial movement therebetween;
- a biasing element disposed between said piston portion and said base member and urging said piston portion away from said base member; and
- a bonding agent forming a bond between said indicator member and said cylinder portion to thereby restrain said indicator member from movement away from said base member under action of said biasing element, said bonding agent being thermosensitive to substantially release said bond between said indicator member and said cylinder portion when a temperature of said bonding agent substantially teaches said specified temperature;
- said temperature indicator assembly additionally including an attachment apparatus for releasably attaching said cartridge to said cartridge holder to thereby form an assembled structure, said stem portion of said indicator member extending into said bore in said assembled structure.

17. A method for visually indicating when a specified temperature has been exceeded in a fluid flow through a conduit, according to claim 16, wherein said cartridge holder is provided with at least one port for providing communication of such fluid from an exterior of said cartridge holder to said bonding agent when said temperature indicator assembly is mounted in such aperture and projects therethrough into such fluid flow and said bonding agent is disposed adjacent both said piston portion and wherein said cylinder portion to thereby bond said piston portion and said cylinder portion together.

18. A method for visually indicating when a specified temperature has been exceeded in a fluid flow through a conduit, according to claim 17, wherein said cylinder portion includes a first cup-shaped structure extending outwardly from and contiguous with said base member, said piston portion includes a second cup-shaped structure extending outwardly from and contiguous with said stem portion and said biasing element is disposed, at least in part, within said first and second cup-shaped structures and exerts said biasing force therebetween.

19. A method for visually indicating when a specified temperature has been exceeded in a fluid flow through a conduit, according to claim 18, wherein said cartridge holder has an exposed surface when said assembled structure of said temperature indicator assembly is mounted in such aperture of such conduit such that said temperature indicator assembly projects through such aperture and into such fluid flow and said temperature indicator assembly has at least two configurations, a first configuration indicating non-exposure of said bonding agent to such fluid exceeding said specified temperature, said stem portion of said indicator member extending beyond said exposed surface of said cartridge holder a first distance in said first configuration, and a second configuration indicating exposure of said bonding agent to such fluid exceeding said specified temperature, said stem portion of said indicator member extending beyond said exposed surface of said cartridge holder a second distance in said second configuration, said second distance being substantially greater than said first distance.

20. A method for visually indicating when a specified temperature has been exceeded in a fluid flow through a conduit, according to claim 19, wherein said bonding agent includes at least one of Indium and an Indium alloy, said biasing element is a coil spring, said first distance is substantially equal to zero and said temperature indicator assembly additionally includes a mounting mechanism for rigidly mounting said temperature indicator assembly in such aperture such that said temperature indicator assembly projects through such aperture and into such fluid flow, an attachment apparatus for releasably attaching said second housing member to said first housing member and a fluid tight seal encircling said stem portion of said indicator member and disposed within said bore.

* * * * *